United States Patent
Steckling

(10) Patent No.: US 8,594,953 B2
(45) Date of Patent: Nov. 26, 2013

(54) INTELLIGENT GAS FLOW SENSOR PROBE

(75) Inventor: Philip J. Steckling, San Luis Obispo, CA (US)

(73) Assignee: ClearWater Tech, LLC, San Luis Obispo, CA (US)

( * ) Notice: Subject to any disclaimer, the term of this patent is extended or adjusted under 35 U.S.C. 154(b) by 519 days.

(21) Appl. No.: 13/043,850

(22) Filed: Mar. 9, 2011

(65) Prior Publication Data

US 2012/0232809 A1   Sep. 13, 2012

(51) Int. Cl.
*G01F 1/00* (2006.01)

(52) U.S. Cl.
USPC .......................................................... 702/45

(58) Field of Classification Search
USPC .......................................................... 702/45
See application file for complete search history.

(56) References Cited

U.S. PATENT DOCUMENTS

| | | |
|---|---|---|
| 3,595,079 A | 7/1971 | Grahn |
| 4,413,514 A | 11/1983 | Bowman |
| 5,212,983 A | 5/1993 | Ott et al. |
| 5,383,357 A | 1/1995 | Doll |
| 5,413,111 A | 5/1995 | Wilkinson |
| 6,245,131 B1 | 6/2001 | Rippelmeyer et al. |
| 6,763,711 B1 | 7/2004 | Nair et al. |
| 7,201,049 B2 | 4/2007 | Ellis et al. |
| 7,210,194 B2 | 5/2007 | Kiern |
| 7,243,538 B1 | 7/2007 | Ramsesh |

OTHER PUBLICATIONS

PIC12F683 Data Sheet, 2007 Microchip Technology Inc.

*Primary Examiner* — Stephen Cherry
(74) *Attorney, Agent, or Firm* — SoCal IP Law Group LLP; Mark A. Goldstein

(57) ABSTRACT

An intelligent gas flow sensor probe which outputs a state signal indicating whether there is forced gas flow present within a conduit or whether there is no gas flow. The intelligent gas flow sensor probe includes a heated thermistor and a reference thermistor functionally coupled to a microcontroller. The heated thermistor is continuously heated at a constant rate to a temperature above an ambient temperature within the conduit and outputs a signal responsive to a change in temperature induced by gas flow incident thereupon. Gas flow within the conduit causes heat to be transferred from the heated thermistor to the gas flowing over and/or around the heated thermistor. The reference thermistor is thermally insulated from the heated thermistor and outputs a reference signal responsive to an ambient temperature of the gas within the conduit. The reference thermistor is used to differentiate between forced gas flow and ambient gas flow based on historically obtained temperature data values because flow state determinations are based on real time data which are independent of component tolerances.

32 Claims, 9 Drawing Sheets

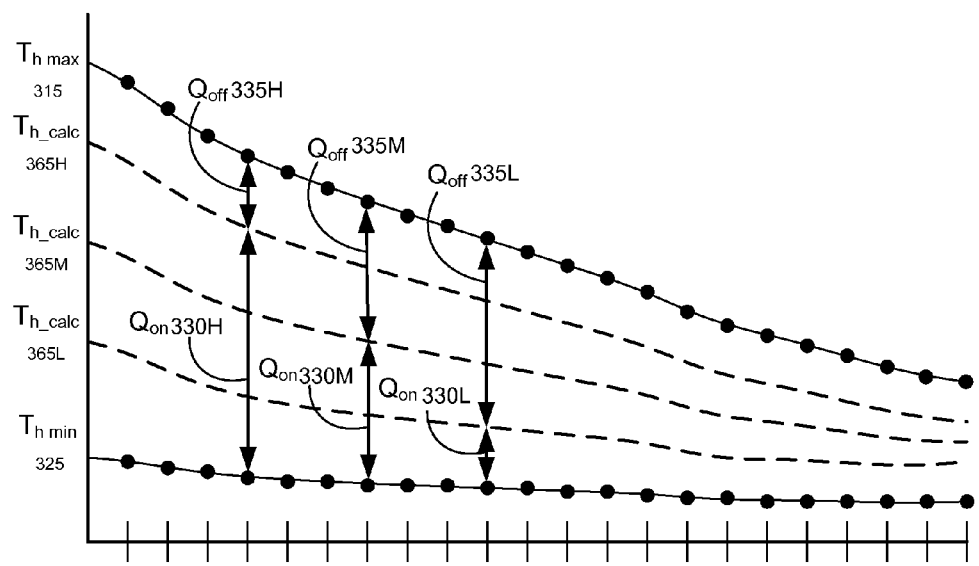
FIG.3C   Historical Reference Temperatures $T_{r\_H\,390}$
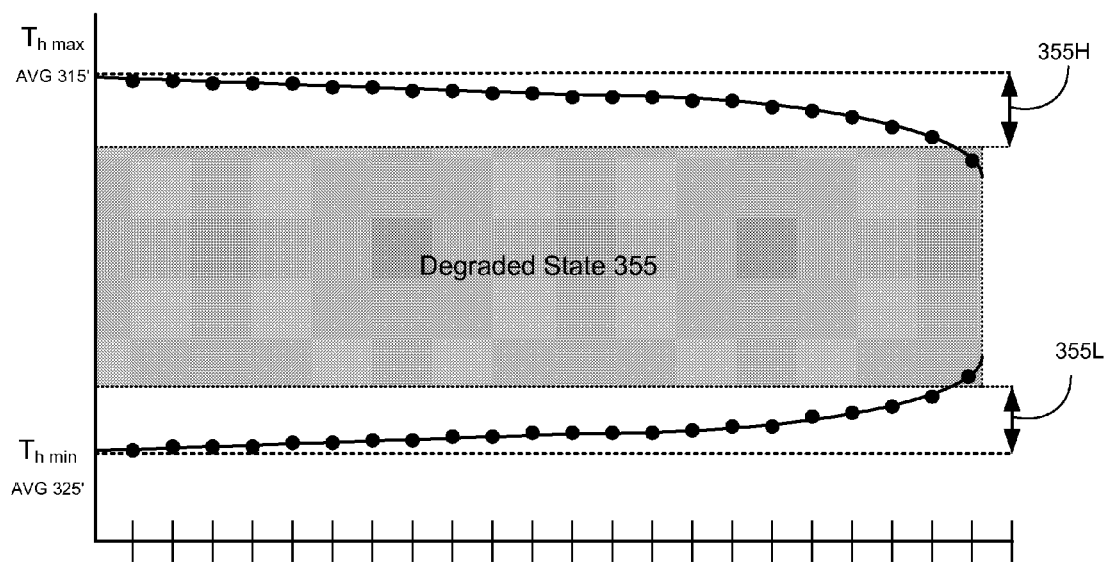
FIG.3D   Time

INTELLIGENT GAS FLOW SENSOR PROBE

CROSS-REFERENCE TO RELATED APPLICATIONS

Not Applicable

FEDERALLY SPONSORED RESEARCH AND DEVELOPMENT

Not Applicable

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELEVANT FIELD

This application is directed generally toward gas flow sensor probes and more specifically toward an intelligent gas flow sensor probe for detecting changes in gas flow states within a conduit.

RELEVANT ART OVERVIEW

Numerous types of gas flow sensor probes are known in the relevant art for determining volumetric flow rates. Gas flow sensor probes of the relevant art are typically factory set to measure a predefined gas flow range and cannot be customized to operate in a particular installation environment. For new installations, gas flow sensor probes may be selected which meet the design requirements for quantifying gas flows with the equipment with which the sensor probes are intended to operate. However, in many retrofit installations, the ability to connect gas flow sensor probes with existing equipment may not be possible due to a wide variety of manufacturers, technology changes and/or physical constraints. For a manufacturer of HVAC equipment attempting to interface their device to a wide range of existing equipment, it can be difficult and/or costly to find a gas sensor probe whose output is compatible with their equipment. The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

In view of the foregoing, various exemplary embodiments of an intelligent gas flow sensor probe are described herein. In one exemplary embodiment, an intelligent gas flow sensor probe is constructed using low cost surface mount electronic components installed on a common printed circuit board. The intelligent gas flow sensor probe is configured to be inserted into a small aperture made through a wall of a conduit for sensing a gas flow state within the conduit.

In an exemplary embodiment, the sensor probe comprises a heated thermistor and a reference thermistor functionally coupled to a microcontroller. The heated thermistor is continuously heated at a constant rate to a temperature elevated above an ambient temperature within the conduit and configured to output a heated temperature signal responsive to a gas flow incident thereupon.

The reference thermistor is thermally insulated from the heated thermistor and configured to output an ambient temperature signal responsive to an ambient temperature within the conduit. Both thermistors include negative temperature coefficients and are exposed to the gas flow within the conduit. The microcontroller is programmed to execute instructions from tangible and non-transient memory data storage to locate in microcontroller memory a reference data value closest to a digital representation of the real time ambient temperature signal supplied by the reference thermistor.

The closest ambient reference temperature data value is used as a type of index to locate a stored historical heated temperature data value associated with the stored ambient reference temperature data value. The microcontroller compares the located stored historical heated temperature data value with a digital representation of the real time heated temperature signal. The result of this comparison is used by the microcontroller to determine a present gas flow state within the conduit. Once the present gas flow state with the conduit is determined, the microcontroller signals a control circuit functionally coupled to the microcontroller of the present gas flow state within the conduit.

In an exemplary embodiment, a sensitivity range(s) is provided which allows for setting of sensitivity thresholds for signaling of the control circuit. The sensitivity ranges may be configured to monitor maximum temperatures obtained by the heated thermistor under non-flow gas states within the conduit. Alternately, or in conjunction therewith, the sensitivity range(s) may also be configured to monitor minimum temperatures obtained by the heated thermistor under forced flow gas states within the conduit. Random variations within the sensitivity range(s) are assumed to be either statistical fluctuations or due to ambient gas flows within the conduit and are thus ignored by the microcontroller for purposes of signaling of the control circuit. The sensitivity range(s) may be determined empirically, calculated or estimated based on similar installations of the intelligent gas flow sensor probe. Digital representations of the random variations may still be recorded in memory for future optimization of the sensitivity range(s).

In another exemplary embodiment, the microcontroller may also be provided with executable instructions to detect degraded states which may impact operation of the intelligent gas sensor probe by performing statistical analyses using accumulated historical heated thermistor data values. For example, decreasing maximum temperature data values obtained from the heated thermistor under no gas flow states and/or increasing minimum temperature data values from the heated thermistor under forced gas flow states may be indicative of a degraded state.

In an exemplary embodiment, the heated and reference thermistors may be installed on opposing surfaces of a common printed circuit board, such that a thickness of the printed circuit board provides thermal insulation from a heat source associated with the continuously heated first thermistor.

BRIEF DESCRIPTION OF DRAWINGS

The features and advantages of the various exemplary embodiments will become apparent from the following detailed description when considered in conjunction with the accompanying drawings. Where possible, the same reference numerals and characters are used to denote like features, elements, components or portions of the inventive embodiments. It is intended that changes and modifications can be made to the described exemplary embodiments without departing from the true scope and spirit of the inventive embodiments described herein and as is defined by the claims.

FIG. 3C—depicts a stored historical temperature versus a historical reference temperature graph in accordance with an exemplary embodiment.

FIG. 3D—depicts a stored historical average temperature versus time graph in accordance with an exemplary embodiment.

DETAILED DESCRIPTION

Figure 1:
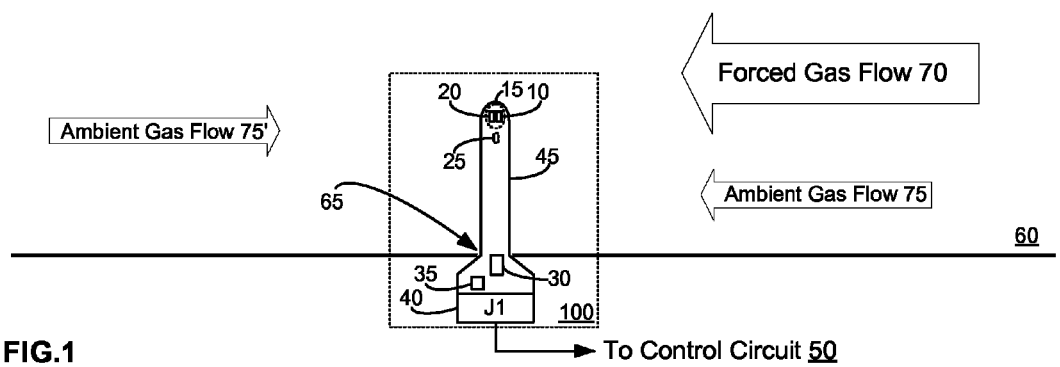
FIG. 1—depicts a block diagram of an intelligent gas sensor probe installed within a conduit in accordance with an exemplary embodiment.

Various exemplary embodiments of an intelligent gas flow sensor probe are disclosed herein. In the following detailed description, numerous specific details are set forth in order to provide a thorough understanding of the present inventive embodiments. It will be apparent to one having ordinary skill in the art that the present inventive embodiments may be practiced without these specific details. In other instances, well-known structures, devices or components may be shown in block diagram form in order to avoid unnecessarily obscuring the present inventive embodiments.

In an exemplary embodiment, an intelligent gas flow sensor probe outputs a state signal indicating whether there is forced gas flow present within a conduit or whether there is no forced gas flow. The intelligent gas flow sensor probe includes a heated thermistor and a reference thermistor functionally coupled to a microcontroller. The heated thermistor is continuously heated at a constant rate to a temperature elevated above an ambient temperature within the conduit and outputs a signal responsive to a change in temperature induced by gas flow within the conduit. Gas flow within the conduit causes heat to be transferred from the heated thermistor to the gas flowing over and/or around the heated thermistor, predominately by convection.

The reference thermistor is thermally insulated from the heated thermistor and outputs an ambient temperature signal responsive to an ambient temperature of the gas within the conduit. The reference thermistor is used to create a stored index of real time data which is referred to for compensating of cooling effects induced by ambient gas flow within the conduit upon the heated thermistor. Forced gas flow causes significantly greater cooling of the heated thermistor which allows the microcontroller to determine that a forced gas flow state exists within the conduit. The microcontroller processes the signals output by the heated and references thermistors according to executable instructions programmed into the microcontroller.

The electrical conductivity of the thermistors has a functional relationship with temperature. For negative temperature coefficient thermistors, resistance decreases as temperature increases resulting in a greater voltage signal output to the microcontroller as temperature increases. For positive temperature coefficient thermistors, resistance increases as temperature increases resulting in a reduced voltage signal output to the microcontroller as temperature increases. Either negative or positive temperature coefficient thermistors may be used to implement the various inventive embodiments, disclosed herein, however, for exemplary purposes, negative temperature coefficient thermistors are described herein.

In an exemplary embodiment, the microcontroller may be programmed to store in memory digital representations of temperature signals generated by the heated thermistor and reference thermistor. When forced gas flow is present, the microcontroller will sense a decrease in electrical conductivity of the heated thermistor. Using the digital representation of the reference thermistor signal, the microcontroller locates historical ambient temperature data stored in memory closest to the real time ambient temperature signal output from the reference thermistor. The microcontroller then compares data stored in memory representing a stored historical heated thermistor data value and compares the real time received heated thermistor signal with the stored historical heated thermistor data value and if the real time temperature signal output from the heated thermistor data meets a sensitivity range(s) condition indicative of a change in gas flow state within the conduit, the microcontroller signals a functionally coupled control circuit of the change in gas flow state. As discussed above, random variations within the sensitivity range(s) are assumed to be either statistical fluctuations or due to ambient gas flows within the conduit and are thus ignored by the microcontroller for purposes of signaling of the control circuit of a change of gas flow state within the conduit.

As such, the intelligent gas flow sensor probe can heuristically adjust to various local environmental conditions, compensate for non-linear responses inherent in thermistors and/or compensate for aging of electronic components based on comparisons because flow state determinations are based on real time data which are not dependent on component tolerances.

The functions or algorithms described herein may be implemented by software or firmware. The software or firmware comprises computer executable instructions stored on computer readable media such as in ROM, RAM and/or EEPROM which form part of a microcontroller. The microcontroller is typically programmed using a complied high level language, for example C or C++. Alternately, the microcontroller can be programmed directly using assembly language. The compiled executable instructions are then stored in memory of the microcontroller. For example, a programmable integrated circuit (PIC) may be used as a microcontroller. A suitable PIC is available from MicroChip, Inc. For explanatory purposes only, model PIC12F683. A datasheet containing specifications for model PIC12F683 is available for download from URL http://www.microchip.com. The datasheet DS41211D for PIC12F683, copyright 2007 is hereby incorporated by reference as if fully set forth herein.

Multiple functions may be performed by modules contained in the microcontroller including analog to digital converters, comparators, input/output communications, temporary and permanent memory storage, system clock, timers and other modules used to support various functions performed by the microcontroller. One skilled in the art will appreciate that other PICs or intelligent devices may be used as alternatives to the PIC. For example, an application specific integrated circuit (ASIC), a microprocessor having suitable analog to digital conversion circuitry and like devices.

Referring to FIG. 1, an exemplary block diagram of an intelligent gas sensor probe 100 installed through a small aperture 65 within a conduit 60 is depicted. In this exemplary embodiment, intelligent gas sensor probe 100 is functionally coupled to control circuit 50. Control circuit 50, may be a state switch which activates upon a signal from intelligent gas sensor probe 100. For example, an outboard air filtration system, ultraviolet light or other device which is activated when forced gas flow 70 is detected by intelligent gas sensor probe 100. Once forced gas flow 70 ceases, intelligent gas sensor probe 100 may signal control circuit 50 of the change in forced gas flow 70 state. The major components of intelligent gas sensor probe 100 include a heated thermistor 10, a heating resistor 20, a reference thermistor 25, a microcontroller 30 and a voltage regulator 35. Ambient gas flow 75, 75' is sensed by both heated thermistor 10 and reference thermistor 25 which electrically respond differently to ambient gas flow 75, 75'. This difference in electrical response is used to match temperature readings obtained from heated thermistor 10 using signals output from reference thermistor 25 to obtain and compare historical temperature data values stored in memory with real time heated thermistor data. A sensitivity range(s) may be provided in which temperature signals output from heated thermistor 10 are used to detect whether a forced gas flow state exists in conduit 60 and/or random fluctuations existing within conduit 60. The sensitivity range(s) is discussed below with respect to FIGS. 3A-3D. The major components are installed on a common printed circuit board 45. Printed circuit board 45 is configured such that a long dimension extends into the gas flow path within conduit 60.

A width of printed circuit board 45 is dimensioned to provide sufficient structural integrity and component distribution without requiring a large aperture to be formed in a wall of conduit 60. A typical width of the portion of printed circuit board 45 inserted into conduit 60 is approximately 0.5 cm. Since ambient gas flow 75 may occur from either a normal forced gas flow path within conduit 60 or in a reverse flow 75'as shown in FIG. 1, printed circuit board 45 should be oriented to avoid gas flow shadowing of either heated thermistor 10 or reference thermistor 25 where possible. One skilled in the art will appreciate that dimensions of printed circuit board 45 may be varied to accommodate a particular installation or design objective.

A distal end of printed circuit board 45 maintains heated thermistor 10, heating resistor 20 and reference thermistor 25. A film 15 disposed upon a surface of printed circuit board 45 may be used to transfer heat generated by heating resistor 20 to heated thermistor 10. A proximate end of printed circuit board 45 may include a jack or plug J1 40 for functionally coupling intelligent gas sensor probe 100 with control circuit 50.

Figure 1A:
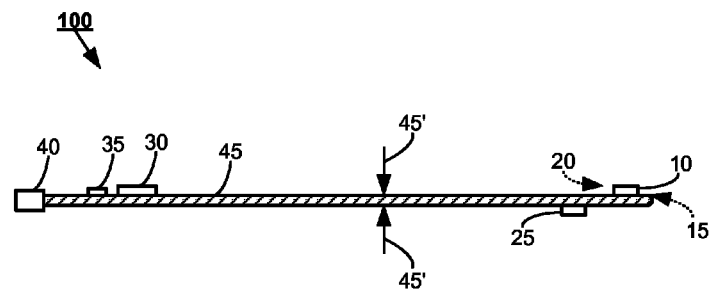
FIG. 1A—depicts a side view of an intelligent gas sensor probe in accordance with an exemplary embodiment.

Referring to FIG. 1A, an exemplary side view of intelligent gas sensor probe 100 is depicted. In this exemplary embodiment, relative component placement on printed circuit board 45 of heated thermistor 10, heating resistor 20, reference thermistor 25, microcontroller 30 and voltage regulator 35 is depicted. In one exemplary embodiment, reference thermistor 25 is installed on an opposite side of printed circuit board 45 from heated thermistor 10 and heating resistor 20. A thickness 45' of printed circuit board 45 provides sufficient thermal insulation for reference thermistor 25 to measure ambient temperatures within conduit 60 without being influenced by heat generated by heating resistor 20.

Printed circuit board 45 may be constructed from composite epoxy material (CEM), polyimide or Teflon® and is primarily dependent on the operating conditions encountered within conduit 60. In most circumstances, CEM should sufficient. The thickness 45' of printed circuit board 45 may be anywhere from about 5-40 mils again depending on the operating conditions in which intelligent gas sensor probe 100 is expected to encounter.

In an exemplary embodiment, heated thermistor 10, heating resistor 20, reference thermistor 25, microcontroller 30 and voltage regulator 35 utilize surface mount packaging which allows for wave soldering, reduced costs and also minimizes interference with sensing of ambient gas flow 75, 75' conditions within conduit 60 due to component shadowing effects. Placement of reference thermistor 25 on an opposite side of printed circuit board 45 further reduces possible component shadowing effects while allowing reference thermistor 25 to be thermally exposed to ambient conditions within conduit 60. As shown in FIG. 1, microcontroller 30 and voltage regulator 35 are preferably disposed on a portion of printed circuit board 45 which is not disposed within conduit 60 to minimize degradation due to dust impingement and/or static charge buildup.

Figure 2:
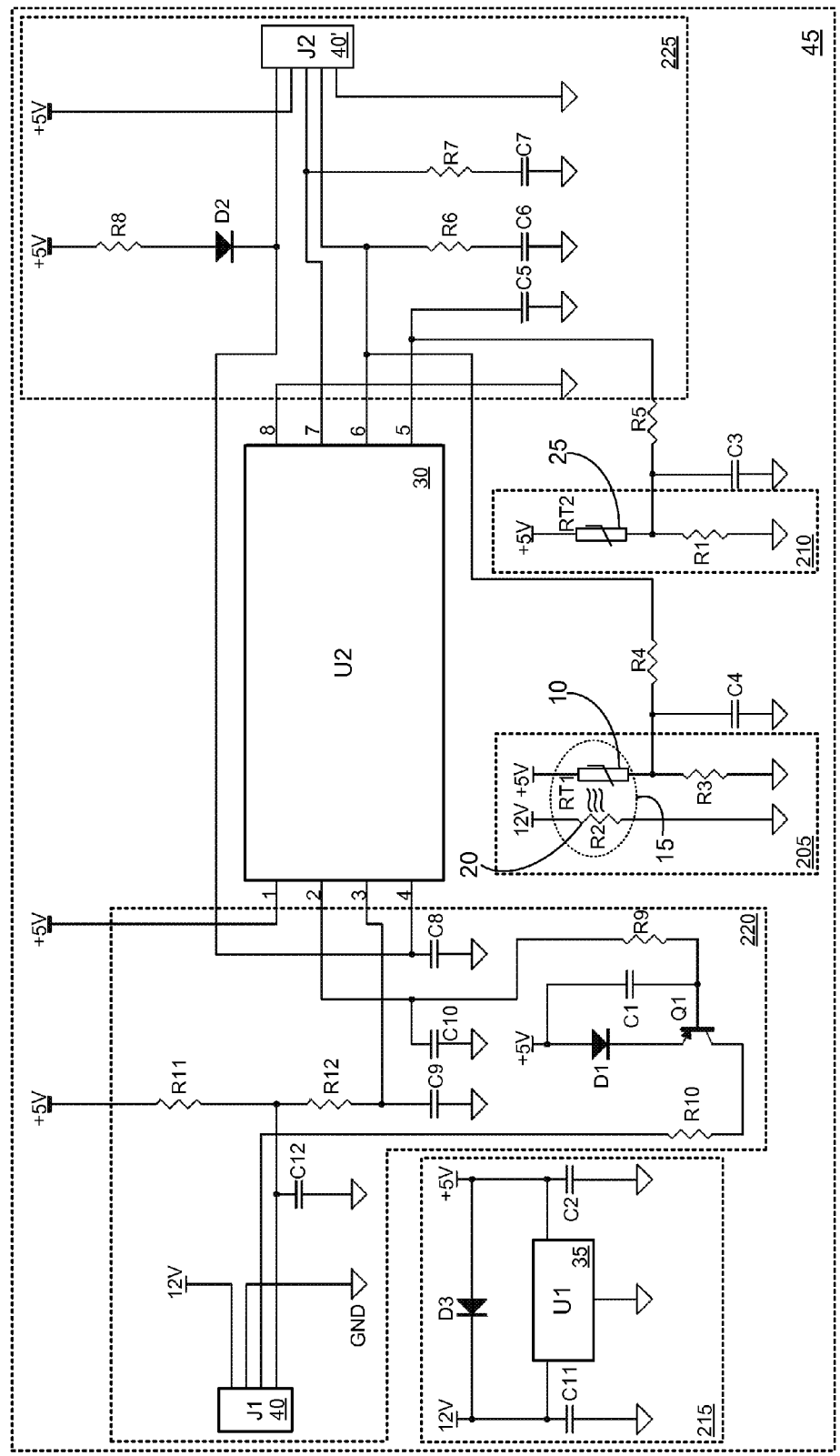
FIG. 2—depicts an electrical circuit diagram of an intelligent gas sensor probe in accordance with an exemplary embodiment.

Referring to FIG. 2, an exemplary electrical circuit diagram of intelligent gas sensor probe 100 is depicted. As discussed above, the electrical components which form intelligent gas sensor probe 100 may be disposed on common printed circuit board 45. Microcontroller U2 30 is the heart of intelligent gas sensor probe 100 and performs all data collection, storage, processing and signaling functions. Microcontroller U2 30 includes tangible and non-transient memory for storage of executable instructions and data received from heated thermistor 10 and reference thermistor 25. The tangible and non-transient memory includes RAM, flash RAM and EEPROM.

Section 205 contains the electrical circuitry associated with heated thermistor 10. Heated thermistor RT1 10 is of a negative temperature coefficient type, whereby resistance decreases inversely to increases in temperature. It is this change in electrical conductivity which is sensed by microcontroller U2 30. Heated thermistor RT1 10 is heated conductively by heating resistor R2 20. In an exemplary embodiment, heating resistor R2 20 is a precision type surface mounted resistor in contact with film 15 and is sized to produce a constant thermal heating output sufficient to raise heated thermistor RT1 10 above ambient temperature. In one exemplary embodiment, heating resistor R2 20 is provided with a separate 12V power supply provided through jack J1 40. Current flow through heating resistor R2 20 causes power to be dissipated by conduction to film 15. Heated thermistor RT1 10 is conductively heated well beyond ambient temperatures within conduit 60 by surface contact with film 15.

Under steady state heated conditions, a voltage signal is generated by heated thermistor RT1 10 by application of +5V DC isolated from ground by resistor R3. Under ambient (unheated) conditions, resistance of resistor R3 is approximately equal to that of heated thermistor RT1 10 which minimizes current flow and thus analog signal output from the circuit of section 205. As heated thermistor RT1 10 is increased in temperature, more current is allowed to flow through heated thermistor RT1 10 which increases analog voltage output from section 205. The analog voltage output signal is fed to pin 6 of microcontroller U2 30. Pin 6 is a general purpose input/output and includes analog to digital conversion which is used by microcontroller U2 30 to convert the voltage analog signals generated by heated thermistor RT1 10 to a digital form.

Section 210 contains the electrical circuitry associated with reference thermistor 25. Reference thermistor RT2 25 is likewise of a negative temperature coefficient type, whereby resistance decreases inversely to increases in temperature. Other than heating resistor R2 20, the electrical circuitry of section 210 is identical to that of section 205. Under equal ambient temperature conditions (unheated), reference thermistor RT2 25 is approximately equal in resistance to heated thermistor RT1 10. Under steady state ambient conditions, a reference analog voltage signal is generated by reference thermistor RT2 25 by application of +5V DC isolated from ground by resistor R1. Under ambient (unheated) conditions, resistance of resistor R1 is approximately equal to that reference thermistor RT2 25 which minimizes current flow and thus the analog voltage signal output from the circuit of section 210 is maintained generally constant at a minimum level. As discussed above, reference thermistor RT2 25 is thermally exposed to ambient conditions within conduit 60. Accordingly, the analog voltage signal generated from section 210 also varies somewhat with changes in temperature within conduit 60, but since reference thermistor RT2 25 is unheated, its electrical response is relatively small in comparison to that of heated thermistor RT1 10.

The analog voltage output signal from section 210 is fed to pin 5 of microcontroller U2 30. Pin 5 is likewise a general purpose input/output and includes analog to digital conversion which is used by microcontroller U2 30 to convert the analog voltage signals generated by reference thermistor RT2 25 to a digital form. As is discussed in detail below, microcontroller U2 30 utilizes real time data representing reference thermistor RT2 25 to locate a corresponding historical data value in memory for heated thermistor RT1 10 for determining whether a forced gas flow state 70 exists within conduit 60 rather than attempting to compensate for voltage signal changes due to rapid and/or minor temperature fluctuations from heated thermistor RT1 10 with reference thermistor RT2 25. This arrangement allows for the use of inexpensive, low precision pairs of thermistors RT1 10, RT2 25. In addition, thermistors RT1 10, RT2 25 do not need to be matched pairs in terms of response to temperature changes.

Figure 3A:
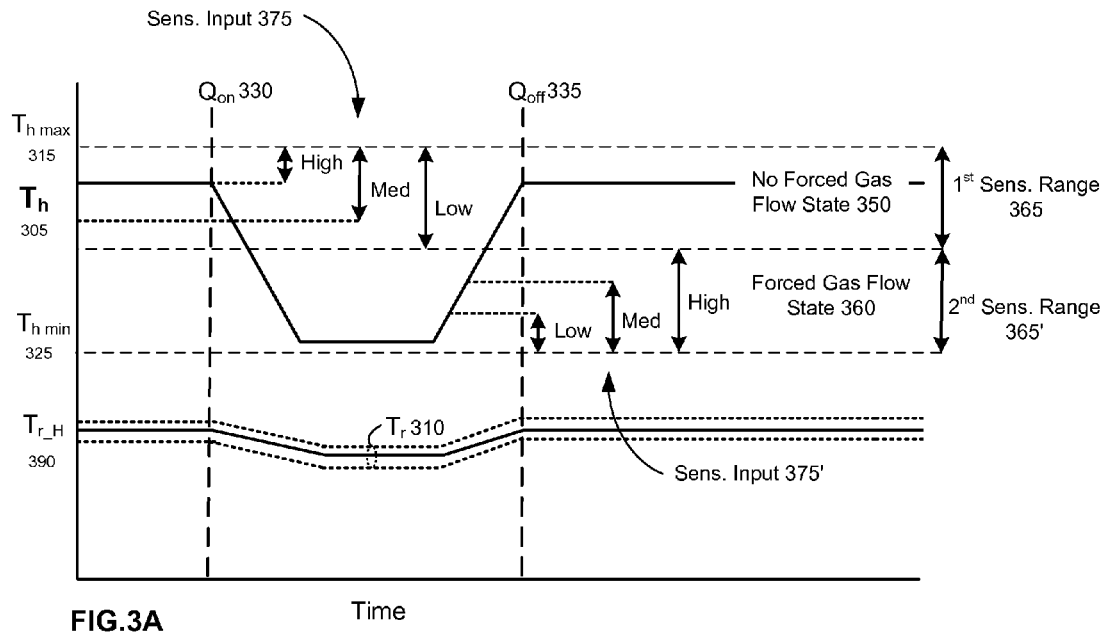
FIG. 3A—depicts a temperature versus time graph in accordance with an exemplary embodiment.

Section 215 includes voltage regulator U1 35 which provides the regulated +5V DC from an external 12 VDC supply (J1 40). The regulated +5V output from voltage regulator 35 is used to power microcontroller U2 30, heated thermistor RT1 10, reference thermistor RT2 25 and programming section 225. Input/Output section 220 allows an external power source and control circuit 50 to be connected through jack J1 40. Transistor Q1 provides TTL compatible output from microcontroller U2 30 through jack J1 40 to external control circuit 50. R11 and R12 provide an input signal to microcontroller U2 30 from jack J1 40 to pin 3 for adjustment of sensitivity settings 375, 375' (FIG. 3A) accessible through J1 40. In an exemplary embodiment, the sensitivity setting is a variable resistance source which may be adjusted empirically during field installation of intelligent gas sensor probe 100. Adding or subtracting resistance may be used to set the Low, Medium, High settings of sensitivity ranges 365, 365' (FIG. 3A). One skilled in the art will appreciate that sensitivity settings may also be downloaded from external control circuit 50 and stored in memory of microcontroller U2 30 and/or calculated from accumulated temperature data and stored in memory of microcontroller U2 30.

When a change in forced gas flow state within conduit 60 is detected by microcontroller U2 30, a TTL compatible output signal is sent from pin 2 of microcontroller U2 30 to control circuit 50. One skilled in the art will appreciate that any of the general purpose I/O pins may be used to signal control circuit 50 of a change in gas flow state within conduit 60 and/or output digital data representing stored temperatures to control circuit 50 for archival purposes and/or determining of predefined sensitivity setting 365, 365'. Section 225 is provided primarily for programming and testing of microcontroller U2 30 through J2 40'.

Referring to FIG. 3A, a first exemplary temperature versus time graph is depicted. In this exemplary embodiment, a first real time temperature graph for heated thermistor 10 is identified on the Y-axis as $T_h$ 305. $T_h$ 305 represents the real time temperature of heated thermistor 10 under all gaseous flow conditions within conduit 60.

A second temperature graph for reference thermistor 25 is identified on the Y-axis as $T_{r\_H}$ 390. $T_{r\_H}$ 390 represents the stored historical ambient temperature measured by reference thermistor 25 under all gaseous flow conditions encountered within conduit 60. A third real time temperature graph for reference thermistor 25 is identified on the Y-axis as $T_r$ 310. $T_r$ 310 represents the real time ambient temperature measured by reference thermistor 25 under all gaseous flow conditions within conduit 60.

A fourth historical temperature graph for heated thermistor 10 is identified on the Y-axis as $T_{h\ max}$ 315. $T_{h\ max}$ 315 represents the stored historical maximum temperature achieved by heated thermistor 10 during no forced gas flow state 350 ($Q_{off}$ 335) within conduit 60 at a particular historical reference thermistor temperature data value $T_{r\_H}$ 390.

A fifth historical temperature graph is identified on the Y-axis as $T_{h\ min}$ 325. $T_{h\ min}$ 325 represents the stored historical minimum temperature heated thermistor 10 achieves during forced gas flow state 360 ($Q_{on}$ 330) within conduit 60 at a corresponding historical ambient temperature $T_{r\_H}$ 390 measured by reference thermistor 25.

During forced gas flow state 360 ($Q_{on}$ 330) convective cooling removes heat generated by heating resistor 20 from heated thermistor 10. Voltage signals generated by heated thermistor 10 indicate a drop in temperature which is sensed by microcontroller 30. Reference thermistor 25 provides real time ambient temperature data $T_r$ 310 representing the ambient temperature within conduit 60. Reference thermistor 25 is likewise cooled during forced gas flow 360 ($Q_{on}$ 330) conditions, although not nearly to the same extent as heated thermistor 10 due in part to inherent non-linear responses of common negative temperature coefficient thermistors as shown in the corresponding graphs for $T_h$ 305 and $T_r$ 310. Since reference thermistor 25 is less affected by changes in gas flow state 360 within conduit 60, the real time ambient temperature $T_r$ 310 measured by reference thermistor 25 is used by microcontroller 30 to locate the closest historical ambient temperature data $T_{r\_H}$ 390 and corresponding historical $T_{h\ max}$ 315 stored in memory.

The historical heated thermistor data values $T_{h\ max}$ 315 stored in memory are used to compare with real time $T_h$ 305 data received from heated thermistor 10. A $1^{st}$ sensitivity range 365 may be defined for historical heated thermistor $T_{h\ max}$ 315 data for minimizing effects of random fluctuations in real time temperature data readings $T_h$ 305 received from heated thermistor 10 under no forced gas flow state 350 ($Q_{off}$ 335) within conduit 60. 1$^{st}$ sensitivity range 365 may further be arbitrarily subdivided into Low, Medium and High sensitivity ranges based on an sensitivity value input 375 which allows intelligent gas sensor probe 100 to be customized for a particular installation.

Analogously, a 2$^{nd}$ sensitivity range 365' may be defined for historical heated thermistor $T_{h\,min}$ 325 data for minimizing effects of random fluctuations in real time temperature data readings $T_h$ 305 received from heated thermistor 10 during forced gas flow state 360 ($Q_{on}$ 330) within conduit 60. Likewise, 2$^{nd}$ sensitivity range 365' may also be arbitrarily subdivided into Low, Medium and High sensitivity ranges 375' based on an sensitivity value input(s) 375' which allows intelligent gas sensor probe 100 to be customized for a particular installation. The sensitivity range(s) 365, 365' may be determined empirically, or set with expected "typical" sensitivity value input(s) or alternately calculated from accumulated historical differential temperature data as described with respect to FIG. 3C below.

In a first exemplary embodiment, 1$^{st}$ sensitivity range 365 is used by microcontroller 30 to detect a forced gas flow state within conduit 60. In this exemplary embodiment, when real time $T_h$ 305 temperature data falls below 1$^{st}$ sensitivity range 365 when compared with historical $T_{h\,max}$ 315 data stored in memory, a significant change in forced gas flow state is determined by microcontroller 30. The change in forced gas flow state causes microcontroller 30 to signal control circuit 50 of a change in forced gas flow state within conduit 60. In this instance, the change in forced gas flow state is an indication of a forced gas flow 360 ($Q_{on}$ 330) condition within conduit 60.

Microcontroller 30 continues sensing and comparing real time heated thermistor data $T_h$ 305 with historical $T_{h\,max}$ 315 data stored in memory. When real time heated thermistor data $T_h$ 305 returns to a temperature data value that falls within 1$^{st}$ sensitivity range 365, microcontroller 30 detects another significant change in forced gas flow state occurred within conduit 60. As before, the change in forced gas flow state causes microcontroller 30 to signal control circuit 50 of the change in forced gas flow state within conduit 60. In this instance, the change in forced gas flow state is indication of a no forced gas flow 350 ($Q_{off}$ 335) condition within conduit 60.

In a second exemplary embodiment, 2$^{nd}$ sensitivity range 365' is used by microcontroller 30 to determine a forced gas flow state within conduit 60. In this exemplary embodiment, when real time $T_h$ 305 temperature data falls within 2$^{nd}$ sensitivity range 365' when compared with historical $T_{h\,max}$ 315 data stored in memory, a significant change in forced gas flow state is detected by microcontroller 30. The change in forced gas flow state causes microcontroller 30 to signal control circuit 50 of a change in forced gas flow state within conduit 60. In this instance, the change in forced gas flow state is an indication of forced gas flow 360 ($Q_{on}$ 330) condition within conduit 60.

As previously described, microcontroller 30 continues sensing and comparing real time heated thermistor data $T_h$ 305 with historical $T_{h\,min}$ 325 data stored in memory. In this exemplary embodiment, when real time heated thermistor data $T_h$ 305 rises above 2$^{nd}$ sensitivity range 365', microcontroller 30 detects another significant change in forced gas flow state within conduit 60. As before, the change in forced gas flow state causes microcontroller 30 to signal control circuit 50 of a change in forced gas flow state within conduit 60. In this instance, the change in forced gas flow state is indication of a no forced gas flow state 350 ($Q_{off}$ 335) condition within conduit 60.

It should be noted that the temperature versus time graph is shown as having linear relationships for ease of understanding and explanatory purposes only. However, it is well known in the relevant art that thermistors respond non-linearly to changes in temperature. Temperature versus time graphs for thermistors are more accurately approximated using natural log functions. The graph depicted in FIG. 3A may also represent resistance versus time when thermistors having negative temperature coefficients are employed. One skilled in the art will appreciate that thermistors having positive temperature coefficients may be used as an alternative to negative temperature thermistors. In such implementations, the temperature graphs would be shown as increasing in temperature as forced gas flow conditions were detected within conduit 60.

Figure 3B:
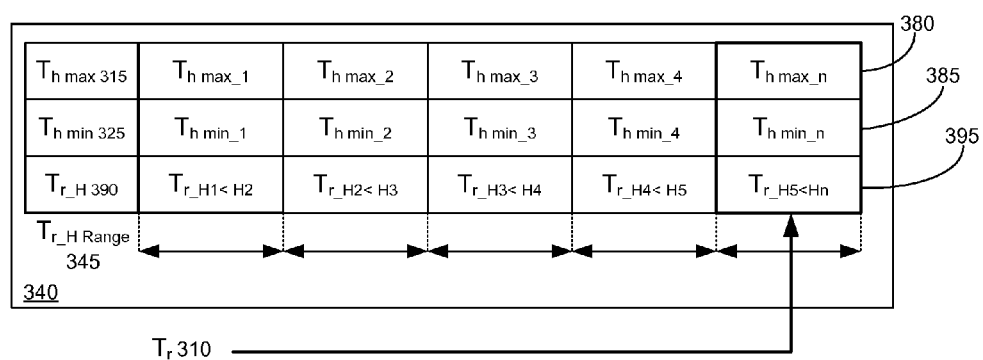
FIG. 3B—depicts a stored historical temperature data value table in accordance with an exemplary embodiment.

Referring to FIG. 3B, an exemplary data table 340 is depicted which is used by microcontroller 30 to determine a gas flow state 350, 360 within conduit 60. Data table 340 is stored in memory of microcontroller 30. One skilled in the art will appreciate that data table 340 may also be configured as a simple lookup table, data array, database or delimited flat file having unique sets of temperature data values.

In an exemplary embodiment, microcontroller 30 receives real time ambient temperature data value $T_r$ 310 from reference thermistor 25. Using this real time ambient temperature data value $T_r$ 310 as a type of index or reference, microcontroller 30 locates the closest historical ambient temperature data stored in data table 340. The closest historical ambient temperature data value $T_{r\_H}$ 390 may be defined in ranges $T_{r\_H\,Range}$ 345. A real time ambient temperature data value $T_r$ 310 which falls within a predefined range $T_{r\_H\,Range}$ 345 utilizes the corresponding historical heated thermistor data value(s) $T_{h\,max}$ 315 and/or $T_{h\,min}$ 325 to determine forced gas flow state 350, 360 condition within conduit 60. In this example, real time ambient temperature data value $T_r$ 310 falls within predefined range historical ambient temperature data value range $T_{r\_H5<Hn}$ 395.

Accordingly, microcontroller 30 compares the stored historical heated thermistor data value(s) $T_{h\,max\_n}$ 380 or $T_{h\,min\_n}$ 385 stored in data table 340 with the real time heated thermistor 10 temperature data value $T_h$ 305. In a first exemplary embodiment, when real time heated thermistor data value $T_h$ 305 falls within 1$^{st}$ sensitivity range 365, microcontroller 30 determines that a no forced flow gas state 350 ($Q_{off}$ 335) exists within conduit 60 and signals control circuit 50 of the no forced gas flow state 350 within conduit 60. Conversely, when real time heated thermistor data value $T_h$ 305 falls below 1$^{st}$ sensitivity range 365, microcontroller 30 determines that a forced flow gas state 360 exists within conduit 60 and signals control circuit 50 of a forced gas flow state 360 ($Q_{on}$ 330) within conduit 60.

In a second exemplary embodiment, when real time heated thermistor $T_h$ 305 data value falls above 2$^{nd}$ sensitivity range 365', microcontroller 30 determines that a no forced flow gas state 350 ($Q_{off}$ 335) exists within conduit 60 and signals control circuit 50 of a no forced gas flow state 350 within conduit 60. Conversely, when real time heated thermistor data value $T_h$ 305 falls within 2$^{nd}$ sensitivity range 365', microcontroller 30 determines that a forced flow gas state 360 ($Q_{on}$ 330) exists within conduit 60 and signals control circuit 50 of the forced gas flow state 360 within conduit 60.

The temperature data stored in data table 340 is periodically updated by microcontroller 30 when real time heated thermistor data value $T_h$ 305 is greater than a stored historical maximum heated thermistor data value $T_{h\,max}$ 315 for a corresponding stored historical ambient temperature data value $T_{r\_H}$ 390. Analogously, microcontroller 30 may update a stored historical minimum heated thermistor data value $T_{h\ min}$ 325 when a real time heated thermistor data value $T_h$ 305 is lower than the stored historical minimum heated thermistor data value $T_{h\ min}$ 325 for a corresponding stored historical ambient reference temperature data value $T_{r\_H}$ 390.

Referring to FIG. 3C, a second exemplary historical heated thermistor versus historical reference thermistor temperature graph is depicted. In this exemplary embodiment, a first historical time temperature graph for heated thermistor 10 is identified on the Y-axis as $T_{h\ max}$ 315. $T_{h\ max}$ 315 represents the maximum temperatures heated thermistor 10 within conduit 60 at a corresponding historical ambient reference temperature data value $T_{r\_H}$ 390 measured by reference thermistor 25 on the X axis as $T_{r\_H}$ 390.

In this exemplary embodiment, a second graph for heated thermistor 10 is identified on the Y-axis as $T_{h\ min}$ 325. $T_{h\ min}$ 325 represents the minimum temperatures heated thermistor 10 achieves under forced gas flow conditions within conduit 60 at a corresponding historical ambient reference temperature data value $T_{r\_H}$ 390 measured by reference thermistor 25 on the X axis as $T_{r\_H}$ 390. The general downward trend of maximum heated thermistor data values $T_{h\ max}$ 315 and/or minimum heated thermistor data values $T_{h\ min}$ 325 illustrate the effects of changes in the temperature readings output from heated thermistor 10 under varying environmental and operating conditions.

The graph shown in FIG. 3C illustrates the ability of microcontroller 30 to index minimum heated thermistor data value $T_{h\ min}$ 325 and maximum heated thermistor data value $T_{h\ max}$ 315 to create a temperature profile map of a particular forced gas system in which intelligent gas flow sensor probe 100 is installed. The temperature profile map minimizes effects of non-linear responses of components, varying degrees of ambient gas flow within conduit 60, component tolerances, placement within conduit 60, etc. Since intelligent gas flow sensor probe 100 uses this temperature profile map to determine forced gas flow states 350, 360 within conduit 60, the effects of non-linear responses of components, varying degrees of ambient gas flow within conduit 60, component tolerances, placement within conduit 60, etc. are essentially nullified for purposes of detecting a forced gas flow state 350, 360 within conduit 60. The temperature profile map provides a functional relationship of stored historical maximum and minimum heated thermistor data value $T_{h\ min}$ 325, $T_{h\ max}$ 315 for various historical reference temperature values $T_{r\_H}$ 390.

In an exemplary embodiment, one or more sensitivity ranges $T_{h\_calc}$ 365H, $T_{h\_calc}$ 365M, $T_{h\_calc}$ 365L may be calculated by microcontroller 30 using sensitivity value input(s) 375, 375' (FIG. 3A). As discussed above, sensitivity range(s) 365, 365' define thresholds for signaling of control circuit 50 by microcontroller 30 of a change in gas flow state 350, 360 within conduit 60. In this exemplary embodiment, a high sensitivity range $T_{h\_calc}$ 365H may be calculated from $T_{h\ max}$ 315, $T_{h\ min}$ 325 and sensitivity value 375. High sensitivity range $T_{h\_calc}$ 365H allows heated thermistor $T_h$ 305 to vary within a sensitivity range defined between a maximum historical heated thermistor $T_{h\ max}$ 315 value for a given historical reference temperature value $T_{r\_H}$ 390 and sensitivity range $T_{h\_calc}$ 365H without triggering of a programmed response from microcontroller 30. In this example, high sensitivity range $T_{h\_calc}$ 365H is the most sensitive setting of intelligent gas flow sensor probe 100. Real time heated thermistor data values $T_h$ 305 falling within high sensitivity range $T_{h\_calc}$ 365H are indicative of a no forced gas flow state 350 ($Q_{off}$ 335H) within conduit 60. When real time heated thermistor data value $T_h$ 305 falls below high sensitivity range $T_{h\_calc}$ 365H, microcontroller 30 determines that a change in gas flow state has occurred indicative of a forced gas flow state 360 ($Q_{on}$ 330H) and signals control circuit 60 of a change in gas flow state within conduit 60.

Analogously, in a second exemplary embodiment, a second medium sensitivity range $T_{h\_calc}$ 365M may be calculated from $T_{h\ max}$ 315, $T_{h\ min}$ 325 and sensitivity value 375. Medium sensitivity range $T_{h\_calc}$ 365M allows heated thermistor $T_h$ 305 to vary within a sensitivity range defined between a maximum historical heated thermistor $T_{h\ max}$ 315 value for a given historical reference temperature value $T_{r\_H}$ 390 and sensitivity range $T_{h\_calc}$ 365M without triggering of a programmed response from microcontroller 30. Medium sensitivity range $T_{h\_calc}$ 365M is less sensitive than high sensitivity range $T_{h\_calc}$ 365H and allows for greater temperature fluctuations of heated thermistor $T_h$ 305 before microcontroller 30 signals control circuit 50 of a change in gas flow state within conduit 60. Real time heated thermistor data values $T_h$ 305 falling within medium sensitivity range $T_{h\_calc}$ 365M are again indicative of a no forced gas flow state 350 ($Q_{off}$ 335M) within conduit 60. When real time heated thermistor data value $T_h$ 305 falls below medium sensitivity range $T_{h\_calc}$ 365M, microcontroller 30 determines that a change in gas flow state has occurred indicative of a forced gas flow state 360 ($Q_{on}$ 330M) and signals control circuit 60 of a change in gas flow state within conduit 60.

In a third exemplary embodiment, a low sensitivity range $T_{h\_calc}$ 365L may be calculated from $T_{h\ max}$ 315, $T_{h\ min}$ 325 and sensitivity value 375. Low sensitivity range $T_{h\_calc}$ 365L allows heated thermistor $T_h$ 305 to vary within a sensitivity range defined between a maximum historical heated thermistor $T_{h\ max}$ 315 value for a given historical reference temperature value $T_{r\_H}$ 390 and sensitivity range $T_{h\_calc}$ 365L without triggering of a programmed response from microcontroller 30. Low sensitivity range $T_{h\_calc}$ 365M is the least sensitive range and allows for the greatest temperature fluctuations of heated thermistor $T_h$ 305 before microcontroller 30 signals control circuit 50 of a change in gas flow state within conduit 60. Analogous to the previous discussions, real time heated thermistor data values $T_h$ 305 falling within Low sensitivity range $T_{h\_calc}$ 365L are indicative of a no forced gas flow state 350 ($Q_{off}$ 335L) within conduit 60. When real time heated thermistor data value $T_h$ 305 falls below Low sensitivity range $T_{h\_calc}$ 365L, microcontroller 30 determines that a change in gas flow state has occurred indicative of a forced gas flow state 360 ($Q_{on}$ 330L) and signals control circuit 60 of a change in gas flow state within conduit 60.

In the various exemplary embodiments described above, determination of High, Medium and/or Low Sensitivity Ranges $T_{h\_calc}$ 365H, $T_{h\_calc}$ 365M, $T_{h\_calc}$ 365L may be calculated using the expression [($T_{h\ max}$ 315−$T_{h\ min}$ 325)× Sensitivity Value 375]+$T_{h\ min}$ 325 for a given historical ambient thermistor temperature Tr_H 390. One skilled in the art will appreciate that other expressions may be used to calculate High, Medium and/or Low Sensitivity Ranges $T_{h\_calc}$ 365H, $T_{h\_calc}$ 365M, $T_{h\_calc}$ 365L Likewise, one skilled in the art will appreciate that sensitivity value 375, 375' (FIG. 3A) may be a potentiometer setting which allows for setting of continuously variable sensitivity ranges anywhere between $T_{h\ max}$ 315 and $T_{h\ min}$ 325 where necessary to meet the requirements of a particular installation.

Referring to FIG. 3D, an exemplary historical average temperature versus time graph is depicted. In this exemplary embodiment, historical average maximum heated thermistor data values $T_{h\ max\ AVG}$ 315' and/or historical average minimum heated thermistor data values $T_{h\ min\ AVG}$ 325' are plotted as a function of time. Each stored historical average maximum heated thermistor data value $T_{h\ max\ AVG}$ 315' and each historical average minimum heated thermistor data values $T_{h\ minAVG}$ 325' determined over a period of time from which a degraded state 355 may be detected.

A degraded state 355 may be detected by microprocessor 30 using averaged heated thermistor data values of $T_{h\ max\ AVG}$ 315' and/or $T_{h\ min\ AVG}$ 325'. In one exemplary embodiment, a downward trend in average maximum heated thermistor data values $T_{h\ max\ AVG}$ 315' may be indicative of degraded state 355 somewhere within the system in which intelligent gas sensor probe 100 is monitoring. In general, the downward trend in average maximum heated thermistor data values $T_{h\ max\ AVG}$ 315' provides an indication that heated thermistor 10 is no longer capable of reaching maximum temperature historical data values $T_{h\ max}$ 315 under no flow state conditions 365 ($Q_{off}$ 335) within conduit 60 as determined from each $T_{h\ max\ AVG}$ 315'.

Analogously, an upward trend in minimum heated thermistor data values $T_{h\ min\ AVG}$ 325' may likewise be indicative of a degraded state 355 somewhere within the system in which intelligent gas sensor probe 100 is monitoring. In general, the upward trend in minimum heated thermistor data values $T_{h\ min\ AVG}$ 325' provides an indication that heated thermistor 10 is no longer capable of reaching minimum temperature historical data values $T_{h\ min}$ 325 under forced gas flow state conditions 365' ($Q_{on}$ 335) within conduit 60 as determined from $T_{h\ min\ AVG}$ 325'. Degraded state 355 could potentially affect performance of intelligent gas sensor probe 100 and/or functionally coupled control circuit 50. Detection of degraded state 355 is optional.

In another exemplary embodiment, microcontroller 30 may be used to compare a previous average thermistor data value $T_{h\ max\ AVG}$ 315' or $T_{h\ min\ AVG}$ 325' with a current calculated average thermistor data value $T_{h\ max\ AVG}$ 315' or $T_{h\ min\ AVG}$ 325' for comparison with a defined normal range 355H or 355L of values. If the current calculated average thermistor data value $T_{h\ max\ AVG}$ 315' or $T_{h\ min\ AVG}$ 325' falls outside defined normal range 355H or 355L values, microcontroller 30 signals a functionally coupled control circuit of a detected degraded state 355 as described in FIG. 5 below. As before, detection of degraded state 355 is optional.

Figure 4:
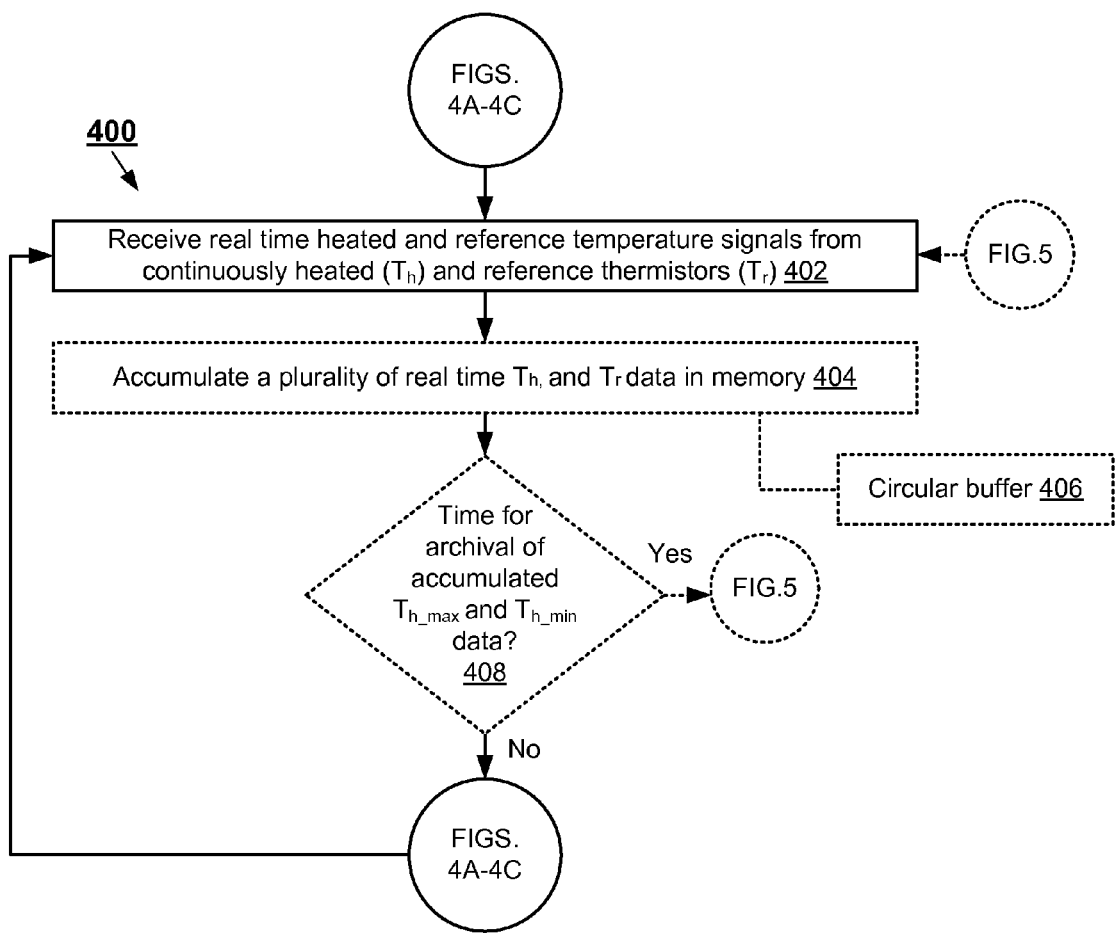
FIG. 4—depicts a first process flow chart executable by an intelligent gas sensor probe in accordance with an exemplary embodiment.

Referring to FIG. 4, an exemplary first process flow chart 400 executable by intelligent gas sensor probe 100 is depicted. In this exemplary embodiment, at block 402, microcontroller 30 receives heated and ambient reference temperature signals from the continuously heated ($T_h$ 305) and reference thermistors ($T_r$ 310) 10, 25. Analog to digital converters functionally coupled with microcontroller 30 convert the analog signals generated by reference thermistor 25 and heated thermistor 10 into heated and ambient reference temperature digital data values from voltage measurements of electrical conductivity data. As discussed previously, electrical conductivity of heated and reference thermistors 10, 25 have a functional relationship with temperature.

Figure 5:
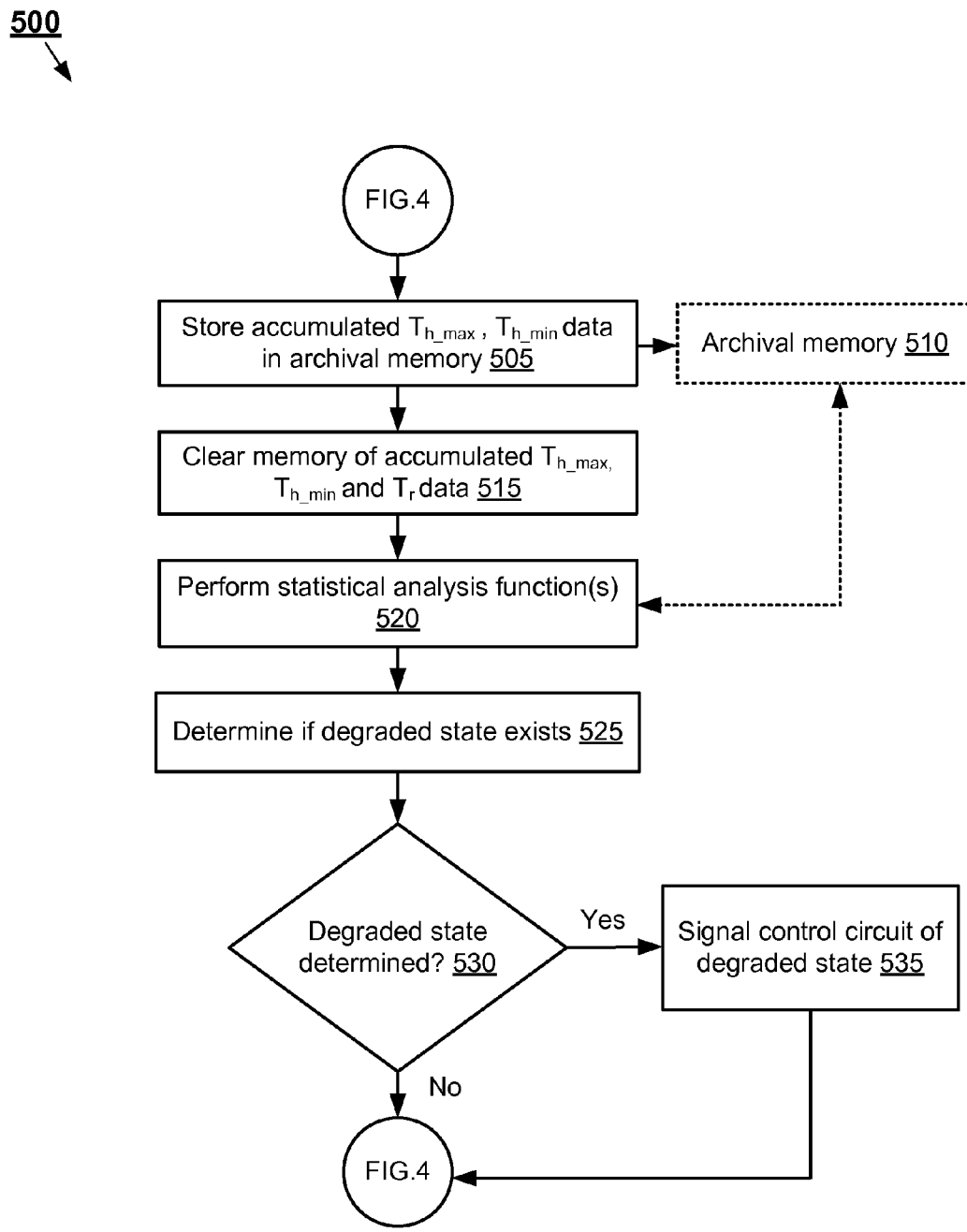
FIG. 5—depicts a fifth process flow chart executable by an intelligent gas sensor probe in accordance with an exemplary embodiment.

At block 404, microcontroller 30 optionally accumulates a plurality of real time $T_h$ 305, and $T_r$ 310 data in memory for future statistical analysis as described in the discussion accompanying FIG. 5. The memory may be configured as a circular buffer 406 having a defined capacity whereby the oldest maximum stored historical heated thermistor temperature data values $T_{h\ max}$ 315 and/or oldest minimum stored historical heated thermistor temperature data values $T_{h\ min}$ 325 achieved by heated thermistor 10 and corresponding stored historical reference thermistor temperature data values $T_r$ 310 are periodically overwritten as in a first in first out (FIFO) relationship. In another exemplary embodiment, the circular buffer 406 may be configured in a last in first out (LIFO) arrangement. In either arrangement, processing optionally continues at decision block 408.

At decision block 408 microcontroller 30 optionally determines whether time for archival of the accumulated maximum stored historical heated thermistor temperature data values $T_{h\ max}$ 315 and/or minimum stored historical heated thermistor temperature data values $T_{h\ mm}$ 325 and associated stored historical reference thermistor temperature $T_r$ data values 310 has arrived. The time for archiving of the accumulated maximum stored historical heated thermistor temperature data values $T_{h\ max}$ 315 and/or minimum stored historical heated thermistor temperature data values $T_{h\ mm}$ 325 and associated stored historical reference thermistor temperature data values $T_r$ 310 is arbitrary and dependent on the memory storage capacity of microcontroller 30. Alternately, stored historical thermistor data values $T_{h\ max}$ 315, $T_{h\ min}$ 325, $T_r$ 310 may be offloaded to a separate microprocessor or microcontroller executing some or all of this process. An exemplary time frame is one month.

If the predetermined amount of time has elapsed, microcontroller continues with process 500 described in the discussion accompanying FIG. 5. Once process 500 has completed; processing resumes at block 402.

Figure 4A:
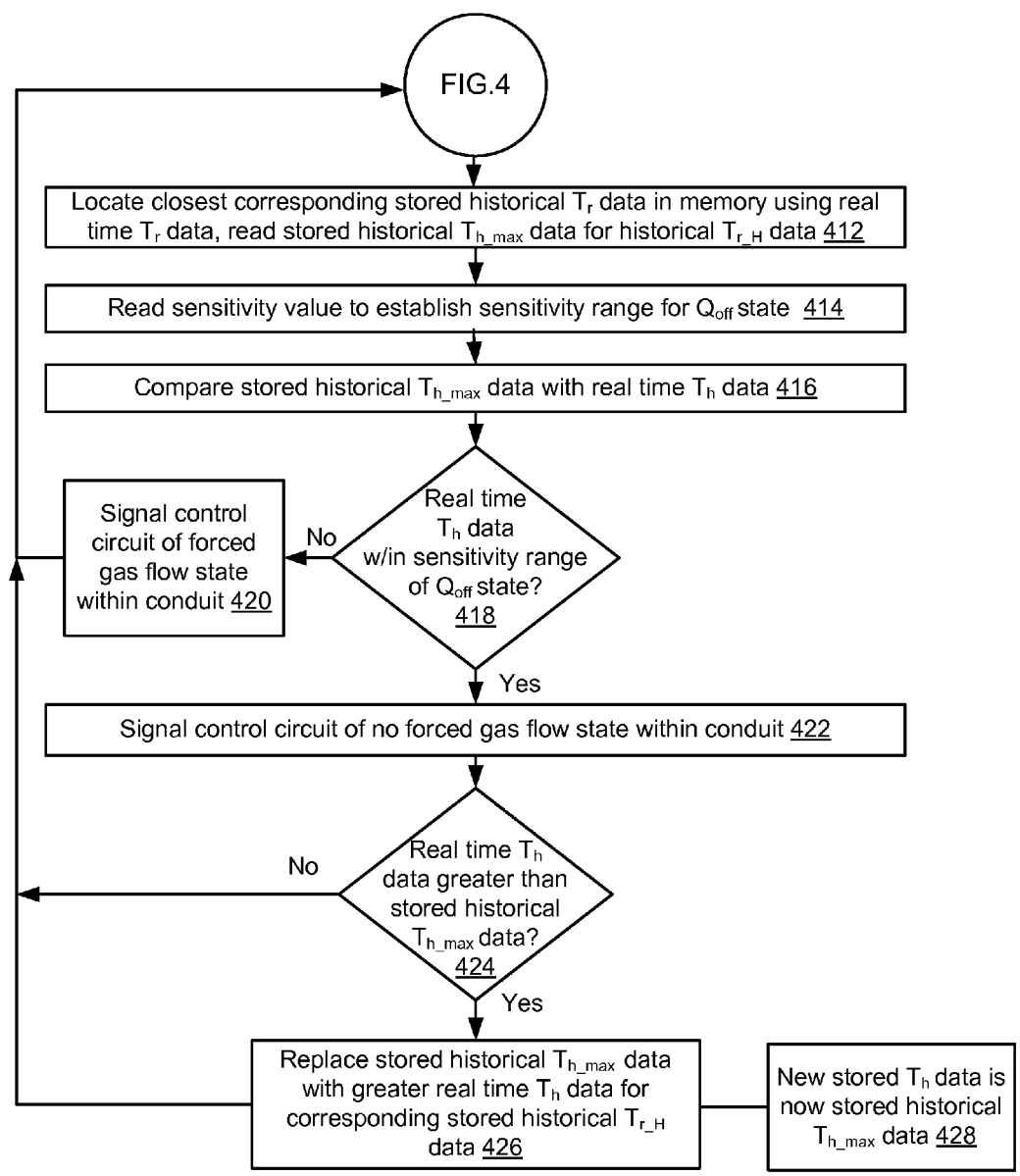
FIG. 4A—depicts a second process flow chart executable by an intelligent gas sensor probe in accordance with an exemplary embodiment.
Figure 4B:
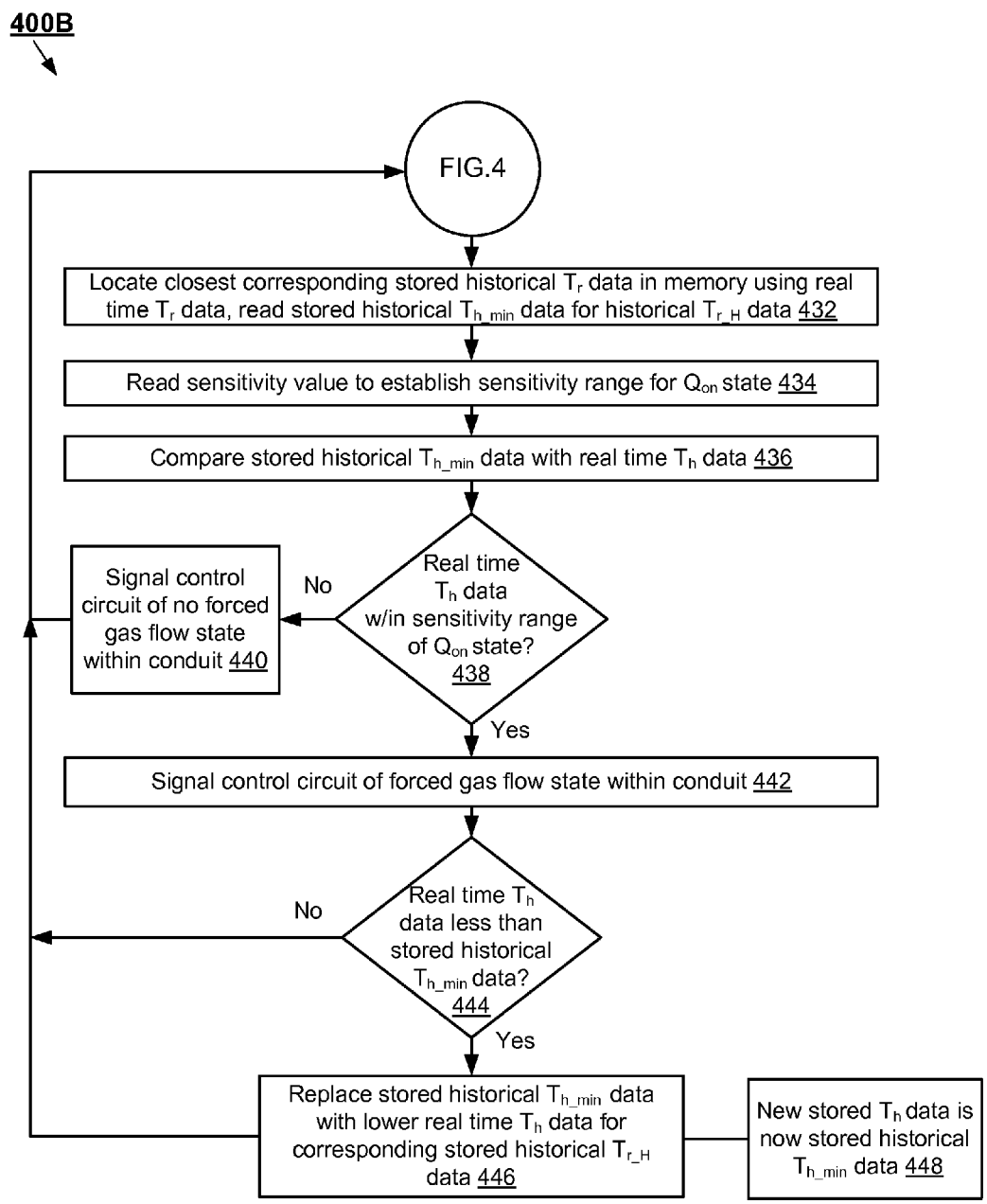
FIG. 4B—depicts a third process flow chart executable by an intelligent gas sensor probe in accordance with an exemplary embodiment.
Figure 4C:
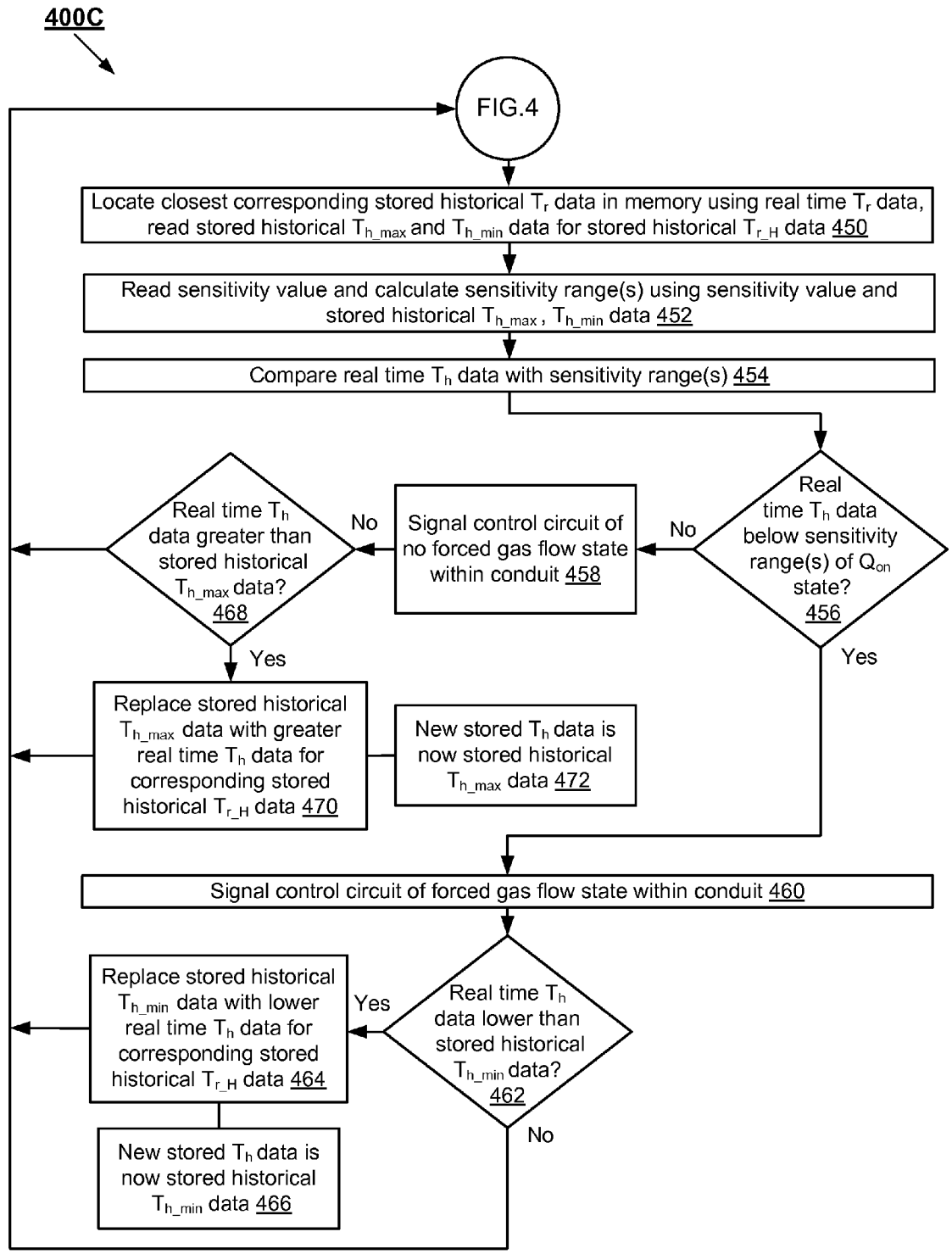
FIG. 4C—depicts a fourth process flow chart executable by an intelligent gas sensor probe in accordance with an exemplary embodiment.

Alternately, at decision block 408, if the predetermined amount of time has not elapsed, microcontroller continues with process 400A, 400B or 400C as described in the discussion accompanying FIG. 4A-4C.

Referring to FIG. 4A, an exemplary second process flow chart 400A executable by intelligent gas sensor probe 100 is depicted. Explanation of this figure is used in conjunction with FIGS. 3A-3D and FIG. 4. In this exemplary embodiment, processing continues from process 400 at block 412. At block 412, microcontroller 30 locates the closest corresponding reference $T_{r\_H5<Hn}$ data value 395 (FIG. 3B) within predefined ranges 345 stored in memory using real time reference thermistor temperature data value $T_r$ 310 and reads stored historical heated thermistor data value $T_{h\ max\_n}$ 380 associated with stored $T_{r\ H5<Hn}$ data value 395.

At block 414, microcontroller 30 reads sensitivity value 375 to establish sensitivity range 365 for a $Q_{off}$ 335 state within conduit 60 from memory or alternately from a functionally coupled control circuit 50. Sensitivity range 365 allows for random fluctuations of real time heated thermistor data value $T_h$ 305 to occur within established sensitivity range 365 without causing a programmed response by microcontroller 30. At block 416, microcontroller 30 compares stored historical heated thermistor data value $T_{h\ max\_n}$ data value 380 with the real time heated thermistor data value $T_h$ 305; processing continues at block 418.

At decision block 418, microcontroller 30 determines whether real time heated thermistor data value $T_h$ 305 is outside of sensitivity range 365 of stored historical heated thermistor data value $T_{h\ max\_n}$ 380 for a no forced gas flow state ($Q_{off}$ 335) within conduit 60. If microcontroller 30 determines that the compared real time $T_h$ data value 305 is outside of sensitivity range 365 of the stored historical heated thermistor data value $T_{h\ max\_n}$ 380; processing continues at block 420.

At block 420, microcontroller 30 signals functionally coupled control circuit 50 of a forced gas flow state ($Q_{on}$ 330) within conduit 60 and processing resumes at block 402 of process 400 (FIG. 4). Alternately, if microcontroller 30 determines at decision block 418 that the compared real time heated thermistor data value $T_{h\ max}$ 305 is not outside sensitivity range 365 of the stored historical heated thermistor data value $T_{h\ max\_n}$ 380; processing continues at block 422. At block 422, microcontroller 30 signals functionally coupled control circuit 50 of a no forced gas flow state ($Q_{off}$ 335) within conduit 60; processing continues at decision block 424.

At decision block 424, microcontroller 30 determines whether the real time heated thermistor data value $T_h$ 305 exceeds the stored historical heated thermistor data value $T_{h\ max\_n}$ 380. If microcontroller 30 determines that the real time heated thermistor data value $T_h$ 305 does not exceed the stored historical heated thermistor data value $T_{h\ max\_n}$ 380; processing resumes at block 402 of process 400 (FIG. 4). Alternately, if microcontroller 30 determines at decision block 424 that the real time heated thermistor data value $T_h$ 305 does exceed the stored historical heated thermistor data value $T_{h\ max\_n}$ 380; processing continues at block 426.

At block 426, microcontroller 30 replaces the stored historical heated thermistor data value $T_{h\ max\_n}$ 380 with the real time heated thermistor data value $T_h$ 305 which is subsequently used for comparison with future real time heated thermistor data values $T_h$ 305. At block 428, the newly stored heated thermistor data value $T_h$ 305 is now stored as the maximum historical heated thermistor data value $T_{h\ max\_n}$ 380 in memory; processing resumes at block 402 of process 400 (FIG. 4).

Referring to FIG. 4B, an exemplary third process flow chart 400B executable by intelligent gas sensor probe 100 is depicted. As before, explanation of this figure is used in conjunction with FIGS. 3A-3D, 4. In this exemplary embodiment, processing continues from process 400 at block 432. This exemplary process operates analogously to the process described for FIG. 4A, but utilizes minimum stored historical heated thermistor data value $T_{h\ min}$ 325 achieved by heated thermistor 10 for a given stored historical ambient temperature data value $T_{r\_H}$ 390.

In this exemplary embodiment, at block 432, microcontroller 30 locates the closest corresponding stored historical reference thermistor data value $T_{r\_H5<Hn}$ 395 (FIG. 3B) within predefined ranges 345 stored in memory using real time reference thermistor temperature data value $T_r$ 310 and reads stored historical heated thermistor data value $T_{h\ min\_n}$ 385 associated with stored historical reference thermistor data value $T_{r\_H5<Hn}$ 395.

At block 434, microcontroller 30 reads a sensitivity value 375' to establish a sensitivity range 365' for a $Q_{on}$ 330 state within conduit 60 from memory or alternately from a functionally coupled control circuit 50. Sensitivity range 365' allows for random fluctuations of real time heated thermistor data value $T_h$ 305 to occur without causing a programmed response by microcontroller 30; processing continues at block 436.

At block 436, microcontroller 30 compares stored historical heated thermistor data value $T_{h\ min\_n}$ 385 with real time heated thermistor data value $T_h$ 305.

At decision block 438, microcontroller 30 determines whether real time heated thermistor data value $T_h$ 305 is within sensitivity range 365' of stored historical heated thermistor data value $T_{h\ min\_n}$ 385 for a forced gas flow state ($Q_{on}$ 330) within conduit 60. If microcontroller 30 determines that the compared real time heated thermistor data value $T_h$ 305 is not within sensitivity range 365' of the stored historical heated thermistor data value $T_{h\ min\_n}$ 385; processing continues at block 440.

At block 440, microcontroller 30 signals functionally coupled control circuit 50 of a no forced gas flow state ($Q_{off}$ 335) within conduit 60; processing resumes at block 402 of process 400 (FIG. 4). Alternately, if microcontroller 30 determines at decision block 438 that compared real time heated thermistor data value $T_{h\ max}$ 305 is within sensitivity range 365' of stored historical heated thermistor data value $T_{h\ min\_n}$ 385, processing continues at block 442. At block 442, microcontroller 30 signals functionally coupled control circuit 50 of a forced gas flow state ($Q_{on}$ 330) within conduit 60; processing continues at decision block 444.

At decision block 444, microcontroller 30 determines whether real time heated thermistor data value $T_h$ 305 is lower than stored historical heated thermistor data value $T_{h\ min\_n}$ 385. If microcontroller 30 determines that real time heated thermistor data value $T_h$ 305 is not lower than stored historical heated thermistor data value $T_{h\ min\_n}$ 385; processing resumes at block 402 of process 400 (FIG. 4). Alternately, if microcontroller 30 determines at decision block 444 that real time heated thermistor data value $T_h$ 305 is lower than stored historical heated thermistor data value $T_{h\ min\_n}$ 385; processing continues at block 446.

At block 446, microcontroller 30 replaces stored historical heated thermistor data value $T_{h\ min\_n}$ 385 with real time heated thermistor data value $T_h$ 305 which is subsequently used for comparison with future real time heated thermistor data values $T_h$ 305. At block 448, the newly stored heated thermistor data value $T_h$ 305 is now the stored historical heated thermistor data value $T_{h\ min\_n}$ 385 in memory; processing resumes at block 402 of process 400 (FIG. 4).

Referring to FIG. 4C, an exemplary fourth process flow chart 400C executable by intelligent gas sensor probe 100 is depicted. Explanation of this figure is used in conjunction with FIGS. 3A-3D, 4. In this exemplary embodiment, processing continues from process 400 (FIG. 4) at block 450. At block 450, microcontroller 30 locates the closest corresponding reference data value $T_{r\_H5<Hn}$ 395 (FIG. 3B) within predefined ranges 345 stored in memory using real time reference thermistor temperature data value $T_r$ 310 and reads stored historical heated thermistor data value $T_{h\ max\_n}$ 380 associated with stored data value $T_{r\ H5<Hn}$ 395 (FIG. 3B). At block 452, microcontroller 30 reads sensitivity value 375 and calculates a sensitivity range $T_{h\_calc}$ 365H, $T_{h\_calc}$ 365M, or $T_{h\_calc}$ 365L (FIG. 3C) using sensitivity value 375 and stored historical $T_{h\ max}$ 305, $T_{h\ min}$ 325 data values.

In this exemplary embodiment, sensitivity range $T_{h\_calc}$ 365H, $T_{h\_calc}$ 365M, and/or $T_{h\_calc}$ 365L is used for determination of a $Q_{off}$ 335 state within conduit 60 from memory or alternately from a functionally coupled control circuit 50. As discussed above, sensitivity range $T_{h\_calc}$ 365H, $T_{h\_calc}$ 365M, or $T_{h\_calc}$ 365L allows for random fluctuations of real time heated thermistor data value $T_h$ 305 to occur within established sensitivity range $T_{h\_calc}$ 365H, $T_{h\_calc}$ 365M, or $T_{h\_calc}$ 365L without causing a programmed response by microcontroller 30; processing continues at block 454. At block 454, microcontroller 30 compares stored historical heated thermistor data value $T_{h\ max\_n}$ data value 380 with the real time heated thermistor data value $T_h$ 305; processing continues at decision block 456

At decision block 456, microcontroller 30 determines whether real time heated thermistor data value $T_h$ 305 is below sensitivity range $T_{h\_calc}$ 365H, $T_{h\_calc}$ 365M, or $T_{h\_calc}$ 365L of stored historical heated thermistor data value $T_{h\ max\_n}$ 380 for a forced gas flow state ($Q_{on}$ 330) within conduit 60. If microcontroller 30 determines at decision block 456 that the compared real time heated thermistor data value $T_{h\ max}$ 305 is not below sensitivity range $T_{h\_calc}$ 365H, $T_{h\_calc}$ 365M, or $T_{h\_calc}$ 365L of stored historical heated thermistor data value $T_{h\ max\_n}$ 380, processing continues at block 458.

At block 458, microcontroller 30 signals functionally coupled control circuit 50 of a no forced gas flow state ($Q_{off}$ 335) within conduit 60 and processing continues at decision block 468. At decision block 468, microcontroller 30 determines whether real time heated thermistor data value $T_h$ 305 is greater than stored historical heated thermistor data value $T_{h\ max\_n}$ 380. If microcontroller 30 determines at decision block 462 that real time heated thermistor data value $T_h$ 305 is not greater than stored historical heated thermistor data value $T_{h\ max\_n}$ 380, processing resumes at block 402 of process 400 (FIG. 4). Alternately, if microcontroller 30 determines that real time heated thermistor data value $T_h$ 305 is greater than stored historical heated thermistor data value $T_{h\ max\_n}$ 380, processing continues at block 470.

At block 470, microcontroller 30 replaces stored historical heated thermistor data value $T_{h\ max\_n}$ 380 with real time heated thermistor data value $T_h$ 305 which is subsequently used for comparison with future real time heated thermistor data values $T_h$ 305. At block 472, the newly stored heated thermistor data value $T_h$ 305 is now stored as the maximum historical heated thermistor data value $T_{h\ max\_n}$ 380 in memory; processing resumes at block 402 of process 400 (FIG. 4).

Alternately, at decision block 456, if microcontroller 30 determines that the compared real time $T_h$ data value 305 is below sensitivity range 365 of the stored historical heated thermistor data value $T_{h\ max\_n}$ 380, processing continues at block 460.

At block 460, microcontroller 30 signals functionally coupled control circuit 50 of a forced gas flow state ($Q_{on}$ 330) within conduit 60; processing continues at decision block 462.

At decision block 462, microcontroller 30 determines whether real time heated thermistor data value $T_h$ 305 is less than stored historical heated thermistor data value $T_{h\ min\_n}$ 385. If microcontroller 30 determines that the real time heated thermistor data value $T_h$ 305 is not less than stored historical heated thermistor data value $T_{h\ min\_n}$ 385, processing resumes at block 402 of process 400 (FIG. 4). Alternately, if microcontroller 30 determines at decision block 462 that real time heated thermistor data value $T_h$ 305 is less than stored historical heated thermistor data value $T_{h\ min\_n}$ 385, processing continues at block 464.

At block 464, microcontroller 30 replaces stored historical heated thermistor data value $T_{h\ min\_n}$ 385 with real time heated thermistor data value $T_h$ 305 which is subsequently used for comparison with future real time heated thermistor data values $T_h$ 305. At block 466, the newly stored heated thermistor data value $T_h$ 305 is now stored as the maximum historical heated thermistor data value $T_{h\ min\_n}$ 380 in memory; processing resumes at block 402 of process 400 (FIG. 4).

Referring to FIG. 5, a fifth exemplary process flow chart 500 executable by an intelligent gas sensor probe 100 is depicted. Explanation of this figure is used in conjunction with FIGS. 3A-3D, 4. In this exemplary embodiment; processing continues from decision block 408 of process 400 (FIG. 4). At block 505, microcontroller 30 stores the accumulated maximum stored historical heated thermistor temperature data values $T_{h\ max}$ 315, and/or minimum stored historical heated thermistor temperature data values $T_{h\ min}$ 325 and associated stored historical reference thermistor temperature data values $T_r$ 310 in archival memory 510; processing continues at block 515.

At block 515, microcontroller 30 clears active memory of accumulated stored maximum historical heated thermistor temperature data values $T_{h\ max}$ 315 and/or minimum stored historical heated thermistor temperature data values $T_{h\ min}$ 325 and associated stored historical reference thermistor temperature data values temperature $T_r$ 310 to allow for acquisition of new accumulated maximum stored historical heated thermistor temperature data values $T_{h\ max}$ 315 and/or minimum stored historical heated thermistor temperature data values $T_{h\ min\_n}$ 385 and associated stored historical reference thermistor temperature data values $T_r$ 310 temperature data. Clearing of stored historical temperature data allows microcontroller 30 to accommodate variations in component tolerances, degraded state operations and other factors which may affect operation of intelligent gas flow sensor probe 100; processing continues at decision block 520.

At block 520, microcontroller 30 or another processing unit performs one or more statistical analysis functions using the archived maximum stored historical heated thermistor temperature data values $T_{h\ max}$ 315 and/or archived minimum stored historical heated thermistor temperature data values $T_{h\ min}$ 325 and/or associated stored historical reference thermistor temperature data values $T_r$ 310. The statistical analysis function(s) may be performed by microcontroller 30 to determine for example, if a degraded state 525 exists within conduit 60 using the data contained in archival memory 510.

A degraded state 355 may be determined based on an average of maximum stored historical heated thermistor temperature data values $T_{h\ max\ AVG}$ 315' and/or archived minimum stored historical heated thermistor temperature data values $T_{h\ min\ AVG}$ 325' as shown in FIG. 3D. Alternately, degraded range(s) 335L, 335H may be a predefined percentage deviation from an average of maximum stored historical heated thermistor temperature data values $T_{h\ max\ AVG}$ 315' and/or archived minimum stored historical heated thermistor temperature data values $T_{h\ min\ AVG}$ 325', for example a 20% (355H, 355L) change from a computed average of $T_{h\ max\ AVG}$ 315' or $T_{h\ min\ AVG}$ 325'. One skilled in the art will appreciate that other statistical analysis functions may be programmed into microcontroller 30 and/or another processing unit operatively coupled to microcontroller 30. At block 525, microcontroller 30 and/or another processing unit determines if a degraded state 355 exists based on results obtained from statistical analysis block 520; processing continues at decision block 530.

At decision block 530, microcontroller 30 evaluates the results obtained from the statistical function to determine whether a degraded state exists within the forced gas flow system. At decision block 530, if microcontroller 30 determines that a degraded state does not exist, processing resumes at block 402 of process 400 (FIG. 4). Alternately, at decision block 530, if microcontroller 30 determines that a degraded state does exist; processing continues at block 535. At block 565, microcontroller 30 signals a control circuit of the determined degraded state; processing resumes at block 402 of process 400 (FIG. 4).

The various exemplary inventive embodiments described herein are intended to be merely illustrative of the principles underlying the inventive concept. It is therefore contemplated that various modifications of the disclosed embodiments will without departing from the inventive spirit and scope be apparent to persons of ordinary skill in the art. They are not intended to limit the various exemplary inventive embodiments to any precise form described. In particular, it is contemplated that intelligent gas flow sensor probe 100 may utilize different electronic components and layouts than those described herein. No specific limitation is intended to executable instruction sequences described herein. Other variations and inventive embodiments are possible in light of the above teachings, and it is not intended that the inventive scope be limited by this specification, but rather by the Claims following herein.

What is claimed:

1. A method comprising:
   providing a sensor probe comprising a heated thermistor and a reference thermistor functionally coupled to a microcontroller, both heated and reference thermistors having equivalent temperature coefficients;
   outputting from the heated thermistor a real time heated temperature signal responsive to a gas flow within the conduit to the microcontroller;
   outputting from the reference thermistor a real time ambient temperature signal responsive to an ambient temperature within the conduit to the microcontroller;
   providing the microcontroller with tangible and non-transient executable instructions for:
   locating in microcontroller memory a stored historical reference data value closest to a digital representation of the real time ambient temperature signal;
   comparing a corresponding historical heated temperature data value associated with the located historical reference data value with a digital representation of the real time heated temperature signal;
   determining a present gas flow state within the conduit from the comparison;
   signaling a control circuit functionally coupled to the microcontroller the determined present gas flow state within the conduit.

2. The method of claim 1 further comprising providing the microcontroller with tangible and non-transient executable instructions by the microcontroller for:
   reading a sensitivity value;
   establishing a sensitivity range using the sensitivity value;
   determining whether the digital representation of the real time heated temperature signal falls within the sensitivity range.

3. The method of claim 2 further comprising providing the microcontroller with tangible and non-transient executable instructions by the microcontroller for:
   signaling the control circuit functionally coupled to the microcontroller when the digital representation of the real time heated temperature signal falls within the sensitivity range.

4. The method of claim 3 wherein the digital representation of the real time heated temperature signal falling within the sensitivity range is one of:
   indicia of a non-forced gas flow state present within the conduit when the sensitivity range is defined for a digital representation of a maximum historical temperature achieved by the heated thermistor;
   indicia of a forced gas flow state present within the conduit when the sensitivity range is defined for a digital representation of a minimum historical temperature achieved by the heated thermistor.

5. The method of claim 2 further comprising providing the microcontroller with tangible and non-transient executable instructions for:
   signaling the control circuit functionally coupled to the microcontroller when the digital representation of the real time heated temperature signal falls outside the sensitivity range.

6. The method of claim 5 wherein the digital representation of the real time heated temperature signal falling outside the sensitivity range is one of:
   indicia of a forced gas flow state present within the conduit when the sensitivity range is defined for a digital representation of a maximum historical temperature achieved by the heated thermistor;
   indicia of a non-forced gas flow state present within the conduit when the sensitivity range is defined for a digital representation of a minimum historical temperature achieved by the heated thermistor.

7. The method of claim 1 further comprising providing the microcontroller with tangible and non-transient executable instructions for:
   determining from the comparison whether the digital representation of the real time heated temperature signal exceeds the stored historical heated temperature data value;
   replacing the stored historical heated temperature data value in memory with the digital representation of the real time heated temperature signal when the stored historical heated temperature data value is exceeded by the digital representation of the real time heated temperature signal for a corresponding historical reference data value.

8. The method of claim 1 further comprising providing the microcontroller with tangible and non-transient executable instructions by the microcontroller for:
   determining from the comparison whether the digital representation of the heated temperature signal is less than the stored historical heated temperature data value;
   replacing the stored historical heated temperature data value in memory with the digital representation of the real time heated temperature signal when the stored historical heated temperature data value is less than the real time digital representation of the heated temperature signal for a corresponding historical reference data value.

9. The method of claim 1 further comprising providing the microcontroller with tangible and non-transient executable instructions by the microcontroller for:
   periodically accumulating in memory a plurality of digital representations of heated temperature signals achieved by the heated thermistor;
   performing a statistical function using the plurality of digital representations of the heated temperature signals;
   storing in memory results of the statistical function.

10. The method of claim 9 further comprising providing the microcontroller with tangible and non-transient executable instructions by the microcontroller for:
    determining from the results of the statistical function whether a degraded state exists;
    signaling the control circuit functionally coupled to the microcontroller when a degraded state is determined.

11. The method of claim 1 further comprising providing the microcontroller with tangible and non-transient executable instructions for:
    determining a temperature profile map of the conduit from data representing stored historical maximum and minimum temperatures of the heated thermistor and corresponding stored historical reference data values;
    calculating a sensitivity threshold value using the temperature profile map for a corresponding stored historical reference data value;
    wherein the sensitivity threshold value defines a transition state between a no forced gas flow state and a forced gas flow state present within the conduit.

12. The method of claim 11 wherein when the digital representation of the real time heated temperature signal falls below the sensitivity threshold value is indicia of a forced gas flow state present within the conduit.

13. The method of claim 11 wherein when the digital representation of the real time heated temperature signal falls between the sensitivity threshold value and the stored historical minimum temperature for the heated thermistor is indicia of a no forced gas flow state with the conduit.

14. The method of claim 11 wherein the sensitivity threshold value varies for at least a portion of the corresponding stored historical reference data values as defined by the temperature profile map.

15. An apparatus comprising:
a sensor probe comprising a heated thermistor and a reference thermistor functionally coupled to a microcontroller, both thermistors having equivalent temperature coefficients;
the heated thermistor being continuously heated at a constant rate to a temperature elevated above an ambient temperature within the conduit and configured to output to the microcontroller, a real time heated temperature signal responsive to a gas flow within the conduit;
the reference thermistor configured to output to the microcontroller, a real time ambient temperature signal responsive to an ambient temperature within the conduit;
the microcontroller comprising executable instructions embodied on a tangible and non-transient computer readable medium for:
locating in microcontroller memory a stored historical reference data value closest to a digital representation of the real time ambient temperature signal;
comparing a corresponding historical heated temperature data value associated with the located historical reference data value with a digital representation of the real time heated temperature signal;
determining a present gas flow state within the conduit from the comparison;
signaling a control circuit functionally coupled to the microcontroller of the present gas flow state within the conduit.

16. The apparatus of claim 15 further comprising tangible and non-transient executable instructions by the microcontroller for:
reading a sensitivity range;
determining whether the digital representation of the real time heated temperature signal falls within the sensitivity range.

17. The apparatus of claim 16 further comprising tangible and non-transient executable instructions by the microcontroller for:
signaling the control circuit functionally coupled to the microcontroller when the digital representation of the real time heated temperature signal falls within the sensitivity range.

18. The apparatus of claim 16 wherein the digital representation of the real time heated temperature signal falling within the sensitivity range is one of:
indicia of a non-forced gas flow state present within the conduit when the sensitivity range is defined for a digital representation of a maximum historical temperature achieved by the heated thermistor; and,
indicia of a forced gas flow state present within the conduit when the sensitivity range is defined for a digital representation of a minimum historical temperature achieved by the heated thermistor.

19. The apparatus of claim 16 further comprising tangible and non-transient executable instructions by the microcontroller for:
signaling the control circuit functionally coupled to the microcontroller when the digital representation of the real time heated temperature signal falls outside the sensitivity range.

20. The apparatus of claim 19 wherein the digital representation of the real time heated temperature signal falling outside the sensitivity range is one of:
indicia of a forced gas flow state present within the conduit when the sensitivity range is defined for a digital representation of a maximum historical temperature achieved by the heated thermistor;
indicia of a non-forced gas flow state present within the conduit when the sensitivity range is defined for a digital representation of a minimum historical temperature achieved by the heated thermistor.

21. The apparatus of claim 15 further comprising tangible and non-transient executable instructions by the microcontroller for:
determining from the comparison whether the digital representation of the real time heated temperature signal exceeds the stored historical heated temperature data value;
replacing the stored historical heated temperature data value in memory with the digital representation of the real time heated temperature signal when the stored historical heated temperature data value is exceeded by the digital representation of the real time heated temperature signal.

22. The apparatus of claim 15 further comprising tangible and non-transient executable instructions by the microcontroller for:
determining from the comparison whether the digital representation of the heated temperature signal is less than the stored historical heated temperature data value;
replacing the stored historical heated temperature data value in memory with the digital representation of the real time heated temperature signal when the stored historical heated temperature data value is less than the real time digital representation of the heated temperature signal.

23. The apparatus of claim 15 further comprising tangible and non-transient executable instructions by the microcontroller for:
periodically accumulating in memory a plurality of digital representations of heated temperature signals achieved by the heated thermistor;
performing a statistical function using the plurality of digital representations of the heated temperature signals;
storing in memory results of the statistical function.

24. The apparatus of claim 23 further comprising tangible and non-transient executable instructions by the microcontroller for:
determining from the results of the statistical function whether a degraded state exists;
signaling the control circuit functionally coupled to the microcontroller when a degraded state is determined.

25. The apparatus of claim 15 further comprising providing the microcontroller with tangible and non-transient executable instructions for:
determining a temperature profile map of the conduit from data representing stored historical maximum and minimum temperature of the heated thermistor and corresponding stored historical reference data values;
calculating a sensitivity threshold value using the temperature profile map for each corresponding stored historical reference data value;
wherein the sensitivity threshold value defines a transition state between a no forced gas flow state and a forced gas flow state present within the conduit.

26. The apparatus of claim 25 wherein when the digital representation of the real time heated temperature signal falls below the sensitivity threshold value is indicia of a forced gas flow state present within the conduit.

27. The apparatus of claim 25 wherein when the digital representation of the real time heated temperature signal falls between the sensitivity threshold value and the stored historical minimum temperature for the heated thermistor is indicia of a no forced gas flow state present within the conduit.

28. The apparatus of claim 25 wherein the sensitivity threshold value varies for at least a portion of the corresponding stored historical reference data values as defined by the temperature profile map.

29. An apparatus comprising:
a sensor probe dimensioned to fit within an aperture formed in a wall of a conduit, the sensor probe comprising a heated thermistor and a reference thermistor functionally coupled to a microcontroller, both heated and reference thermistors having negative temperature coefficients;
the heated and reference thermistors being installed on opposing surfaces of a printed circuit board, such that a thickness of the printed circuit board provides the reference thermistor with thermal insulation from a heat source associated with the heated thermistor;
the heated thermistor being continuously heated at a constant rate to a temperature elevated above an ambient temperature within the conduit and configured to output a real time heated temperature signal responsive to a gas flow within the conduit;
the reference thermistor configured to output a real time ambient temperature signal responsive to an ambient temperature within the conduit;
the microcontroller comprising executable instructions embodied on a tangible and non-transient computer readable medium for:
locating in microcontroller memory a stored historical reference data value closest to a digital representation of the real time ambient temperature signal;
comparing a corresponding historical heated temperature data value associated with the located reference data value with a digital representation of the real time heated temperature signal;
determining from the comparison a present gas flow state within the conduit;
signaling a control circuit functionally coupled to the microcontroller of the present gas flow state within the conduit.

30. The apparatus of claim 29 wherein comparing further comprises tangible and non-transient executable instructions by the microcontroller for:
reading a sensitivity value;
calculating a sensitivity range using the sensitivity value, the historical heated temperature data value and a historical minimum heated thermistor data value;
determining when the digital representation of the real time heated temperature signal falls with the calculated sensitivity range.

31. The apparatus of claim 30 wherein the digital representation of the real time heated temperature signal falling within the sensitivity range is indicia of a non-forced gas flow state present within the conduit.

32. The apparatus of claim 30 further comprising tangible and non-transient executable instructions by the microcontroller for:
signaling the control circuit functionally coupled to the microcontroller at least when the digital representation of the real time heated temperature signal falls outside the sensitivity range.

* * * * *